United States Patent [19]
Sakamoto

[11] Patent Number: 5,363,710
[45] Date of Patent: Nov. 15, 1994

[54] IMPACT SENSING APPARATUS

[75] Inventor: Kazunori Sakamoto, Chiryu, Japan

[73] Assignee: Aisin Seiki Kabushiki Kaisha, Kariya, Japan

[21] Appl. No.: 986,083

[22] Filed: Dec. 4, 1992

[30] Foreign Application Priority Data

Dec. 6, 1991 [JP] Japan ................... 3-323301

[51] Int. Cl.$^5$ ............................................ G05G 17/00
[52] U.S. Cl. .......................................... 74/2; 102/252; 180/282; 280/734
[58] Field of Search .............. 74/2; 180/282; 280/734, 280/735, 737; 102/252

[56] References Cited

U.S. PATENT DOCUMENTS

| | | | |
|---|---|---|---|
| 4,864,086 | 9/1989 | Akiyama et al. | 180/282 X |
| 4,889,068 | 12/1989 | Tabata et al. | 180/282 X |
| 4,927,172 | 5/1990 | Motozawa | 280/734 |
| 5,024,157 | 6/1991 | Nishikawa | 180/282 X |
| 5,142,922 | 9/1992 | Sakamoto et al. | 74/2 |
| 5,193,407 | 3/1993 | Sakamoto et al. | 74/2 |

Primary Examiner—Allan D. Herrmann
Assistant Examiner—David W. Laub
Attorney, Agent, or Firm—Burns, Doane, Swecker & Mathis

[57] ABSTRACT

An impact sensing apparatus is comprised of a housing having therein an inner space, and a unitary assembly independent of the housing upon constitution thereof, accommodated within the housing so as to be secured thereto, and including a frame accommodated within the inner space of the housing, a weight supported on the frame so as to be transferred upon receipt of an impact through the housing, and a firing lever pivotally mounted to the frame and set to be rotated for being extended outside the housing upon transfer of the weight.

2 Claims, 5 Drawing Sheets

— 5,363,710 —

IMPACT SENSING APPARATUS

BACKGROUND OF THE INVENTION

The present invention relates to an impact sensing apparatus, and in particular to an impact sensing apparatus used as a sensor for starting the operation of a safety system such as an air bag or seatbelt tensioner to protect against impact.

A conventional impact sensing apparatus of the type is disclosed in the United States Patent issued under the number of U.S. Pat. No. 5,142,922. This impact sensing apparatus has a housing, a weight freely rotatably and movably supported within the housing at a position offset from the centroid of the weight, a firing lever pivoted to the housing for engaging with the weight, and a spring stretched between the housing and the firing lever for continuously biasing the firing lever in a direction which engages it with the weight.

However, in the foregoing structure, the direct mounting of each of the weight, the firing lever, and the spring to the housing is inevitable, which leads that it is very cumbersome to assemble the conventional impact sensing apparatus. Therefore, the conventional impact sensing apparatus, though it is excellent in concept, fails to comply with requirements for the mass production.

SUMMARY OF THE INVENTION

It is, therefore, a primary object of the present invention to provide an impact sensing apparatus without the foregoing drawback.

In order to attain the foregoing object, an impact sensing apparatus is comprised of a housing having therein an inner space, and a unitary assembly independent of the housing upon constitution thereof, accommodated within the housing so as to be secured thereto, and including a frame accommodated within the inner space of the housing, a weight supported on the frame so as to be transfered upon receipt of an impact through the housing, and a firing lever pivotally mounted to the frame and set to be rotated for being extended outside the housing upon transfer of the weight.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENTS

Preferable embodiments of the present invention will be described hereinunder in detail with reference to the accompanying drawings.

Referring first to FIGS. 1 to 5 inclusive, a first embodiment of an impact sensing apparatus according to the present invention has a housing 1, which is in the form of a rectangular prism, includes a main portion 1a and a lid 1b. Within the housing 1, an inner space is defined in which an impact sensing mechanism 2 is accommodated.

Figure 1:
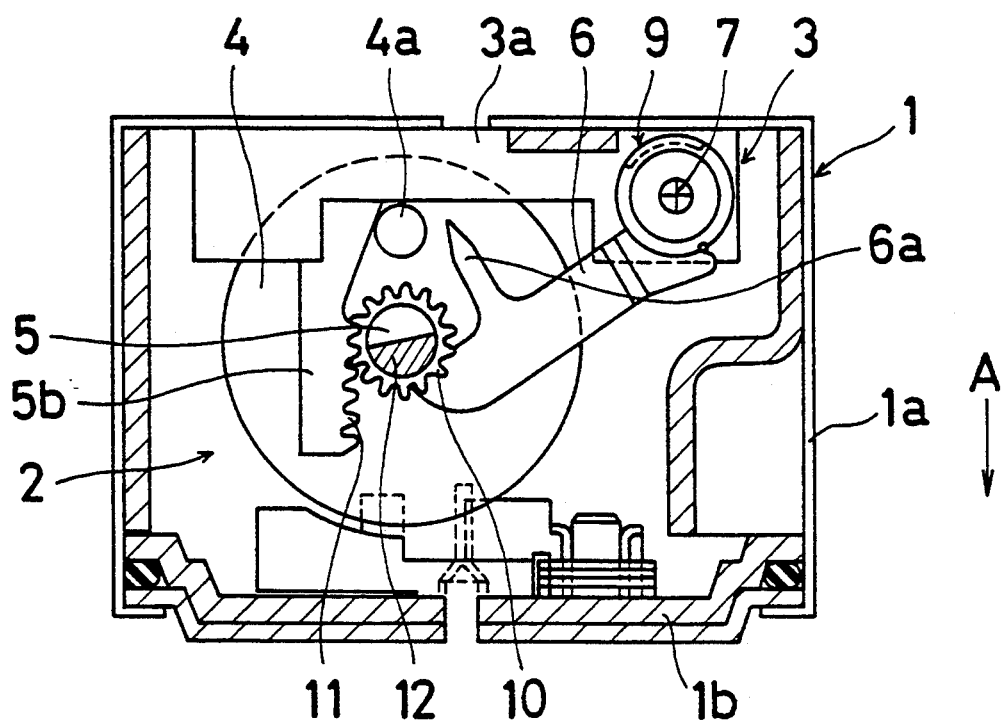
FIG. 1 is a cross sectional view of a first embodiment of an impact sensing apparatus according to the present invention.
Figure 2:
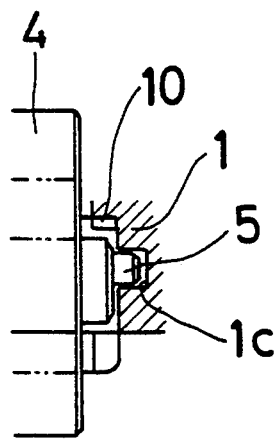
FIG. 2 is a partial plane view of a first embodiment of an impact sensing apparatus according to the present invention.
Figure 3:
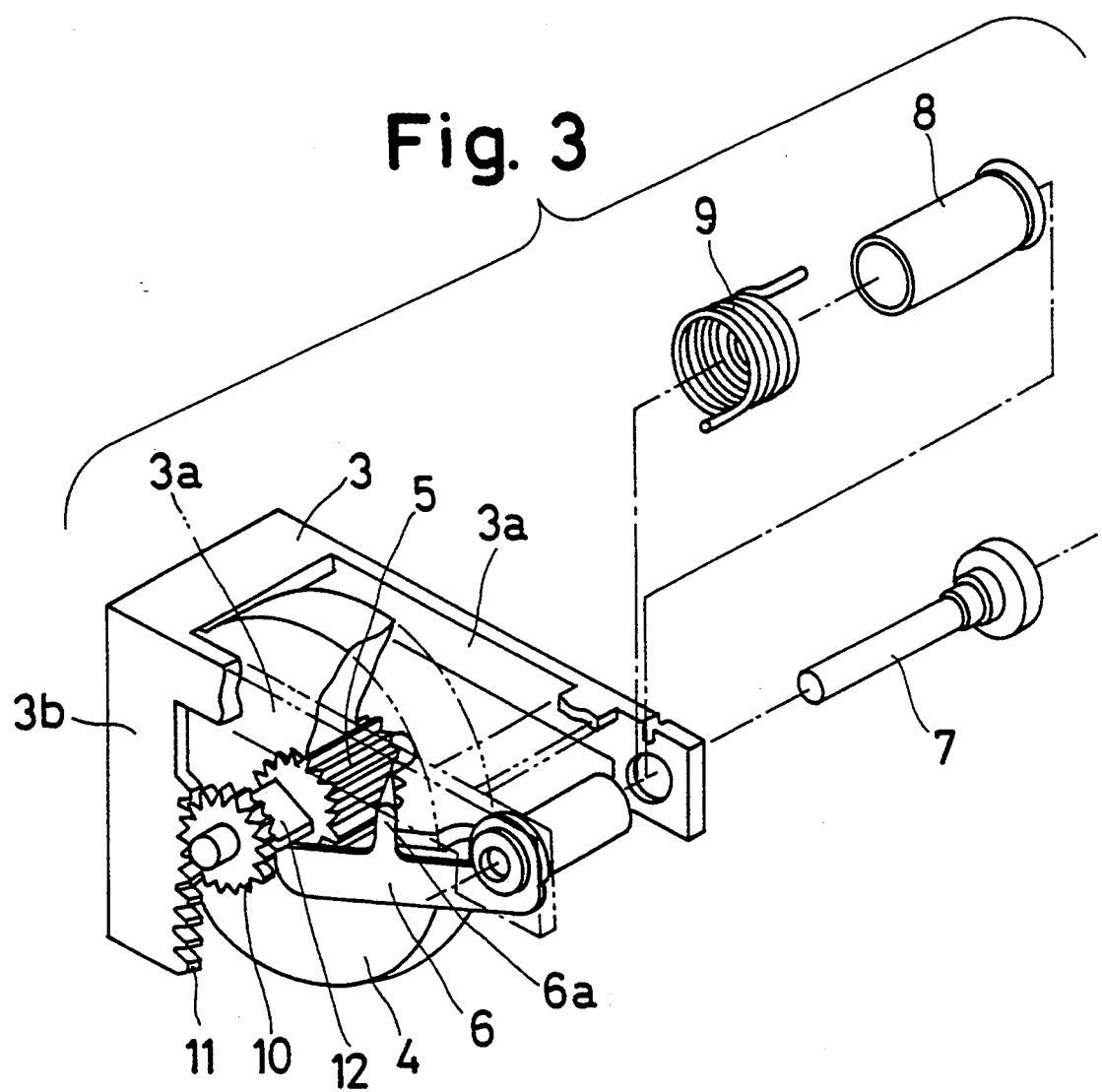
FIG. 3 is an exploded perspective view of the main portion of a first embodiment of an impact sensing apparatus according to the present invention.
Figure 4:
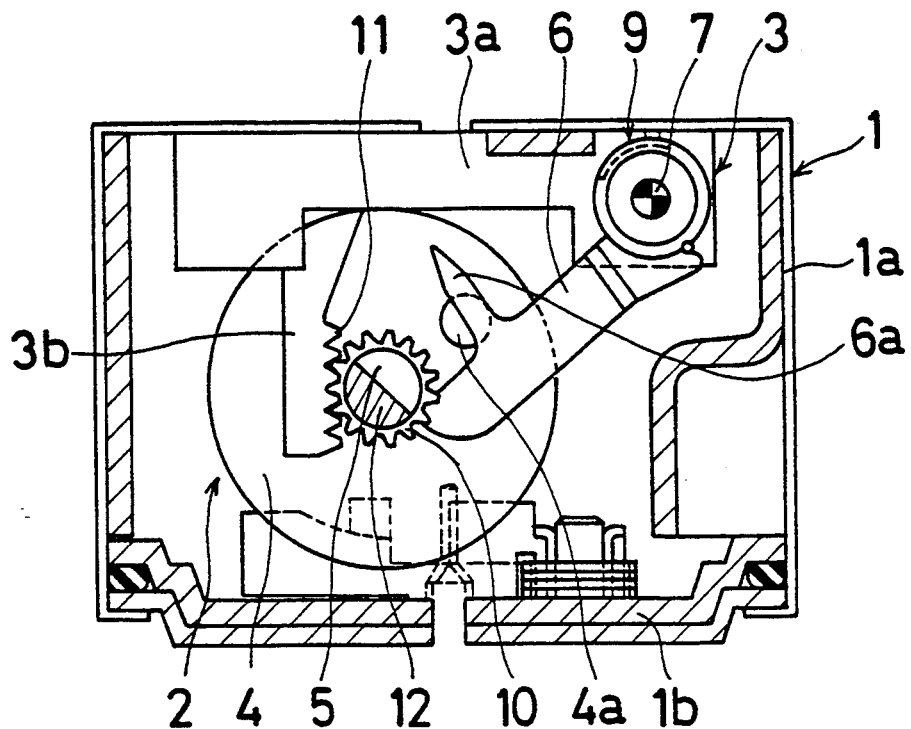
FIGS. 4 and 5 show sequential operations of a first embodiment of an impact sensing apparatus according to the present invention.

As seen from FIGS. 1 and 3, the housing 1 is secured with a frame 3. The frame 3, which is obtained by bending a metal sheet plate, has a pair of laterally spaced supporting portions 3a and a pair of laterally spaced flange portions 3b each of which is perpendicular to the corresponding supporting portion 3a.

A weight 4 has a shaft 5 whose opposite ends are set to be guided along grooves 1c of the housing 1, thereby to assure free rotation of the weight 4 within the housing 1. The weight 4 is formed into a disk shaped configuration and its axis is in alignment with the shaft 5. A stopper pin 4a is secured to the weight 4 so as to be engagible with the supporting portions 3a of the frame 3. The engagement of the stopper pin 4a with each supporting portion 3a establishes the rest position of the weight 4 within the housing 1.

A firing lever 6 is rotatably mounted via a pair of in-series arranged collars 8 on a pin 7 which bridges distal ends of the opposed supporting portions 3a. The firing lever 6 is connected with one end of a torsion spring 9 wound on the collar 8 and the other end thereof is secured to the supporting portion 3a which is far from the firing lever 6. Thus, the firing lever 6 is continually biased or urged in the clockwise direction in FIG. 1. At an intermediate portion of the firing lever 6, there is formed a firing pin 6a which extends therefrom perpendicularly so as to be projected outside the housing 1 through a hole 1d for striking a percussion cap (not shown) when the impact sensing mechanism 2 receives a shock or an impact which will be detailed later.

The shaft 5 is secured thereon with a pinion gear 10 which is in meshing engagement with a rack 11 formed at each of the flange portions 3b of the frame 3. At one end of the shaft 5, there is formed a cam 12 of a semi-circular cross-section which is in engagement with or disengagement from the firing lever 6.

The foregoing structure of the first embodiment of the impact sensing apparatus according to the present invention is constructed or assembled by the following manner.

The pinion gear 10 is brought into engagement with both of the racks 11 thereby holding the weight 4 after connection of the shaft 5 thereto. Then, the firing pin 6 is mounted on the collar 8 and is connected via the torsion spring 9 to the frame 3 and is also brought into engagement with the cam 12. Thus, the weight 4 and the firing lever 6 are supported on the frame 3. This means that these elements constitute a unitary assembly which is independent of the housing 1. Thereafter, the frame 3 as the main portion or body of the foregoing unitary assembly is secured within the housing 1, which establishes the installation of the impact sensing mechanism 2 within the housing 1.

As mentioned above, the firing lever 6, the pinion 10, the rack 11, and the weight 4 are mounted to the frame 3 to constitute a unitary assembly independent of the housing 1. Thus, the unitary assembly is obtained at a process which differs from one for obtaining the housing 1, which enables an improvement in the construction of the impact sensing apparatus per se. The frame 3 per se is very accurate due to the fact that it is obtained from a single sheet metal plate, which assures accuracy between any two of elements 4, 6, 10, and 11. Thus, reliable performance of the impact sensing apparatus can be assured.

Figure 5:
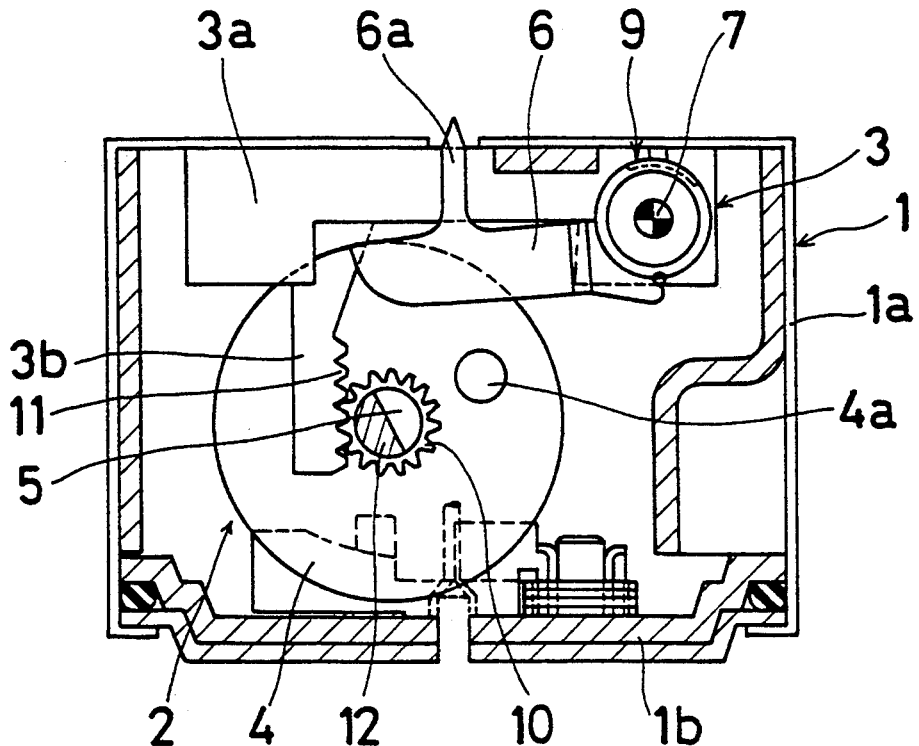

In operation of the first embodiment of the impact sensing apparatus according to the present invention, a shock or impact is applied to the housing 1 in the direction of "A" in FIG. 1 which shows the rest condition of the impact sensing apparatus. The weight 4 under rotation is moved in the downward direction in FIG. 3 in such a manner that the pinion gears 10 secured to the weight 4 are moved along the corresponding racks 11, respectively, thereby releasing the firing pin 6 from the cam 12. Then, as shown in FIG. 5, the firing lever 6 is rotated in the clockwise direction by the biasing force of the torsion spring 9, and the firing pin 6a strikes the percussion cap after being projected outside the housing 1 through a hole 1d.

It is to be noted that the holding of the weight 4 at the rest condition of the apparatus and the biasing of the firing lever 6 upon actuation of the impact sensing mechanism 2 are established by the common spring 9, which serves for the reduction of the number of parts and ensures the extraction of a large energy from the firing lever 6 within the narrow inner space of the housing 1. As a whole, such structure enables the miniaturization of the apparatus per se. In addition, the disk shaped weight 4 enables the establishment of a large inertia moment, resulting in that an instantaneous impact or shock as not detected by the weight 4 during the vehicle's travel on a rough road. Thus, an unexpected operation of the apparatus can be prevented, which leads to a remarkable improvement of the reliability of the apparatus.

Hereinafter, a second embodiment of an impact sensing apparatus according to the present invention will be described. The elements of the second embodiment of the apparatus which correspond to elements of the first embodiment are designated with a prime designation. To the extent the features illustrated in FIGS. 6-9 have already been described above, a detailed description of those features will not be repeated here.

Figure 6:
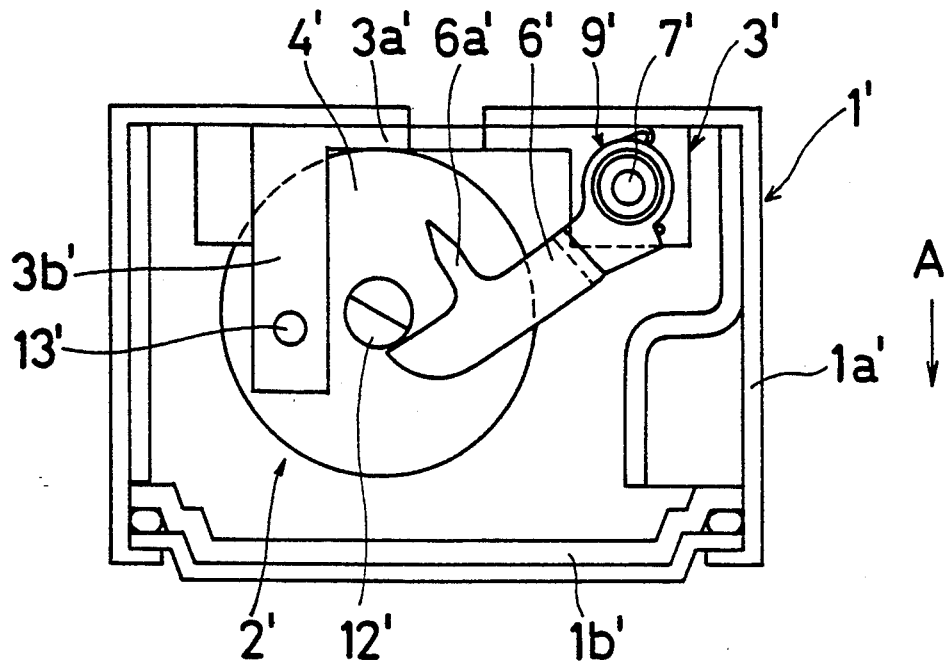
FIG. 6 is a cross sectional view of a second embodiment of an impact sensing apparatus according to the present invention.
Figure 7:
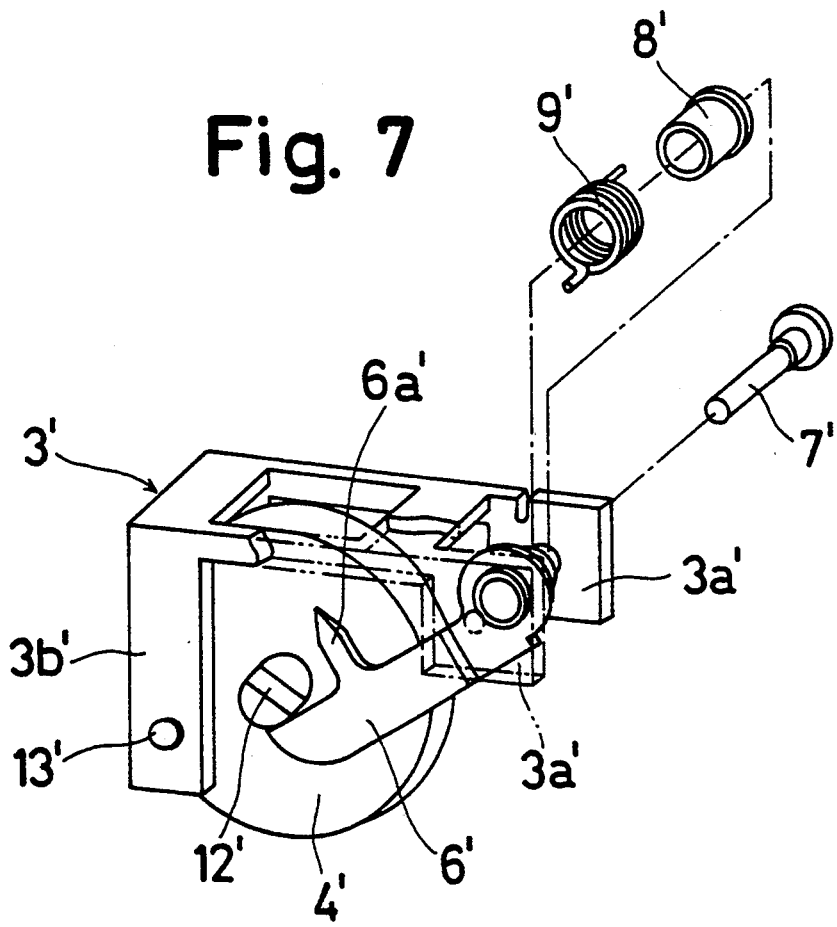
FIG. 7 shows an exploded perspective view of the main portion of a second embodiment of an impact sensing apparatus according to the present invention.
Figure 8:
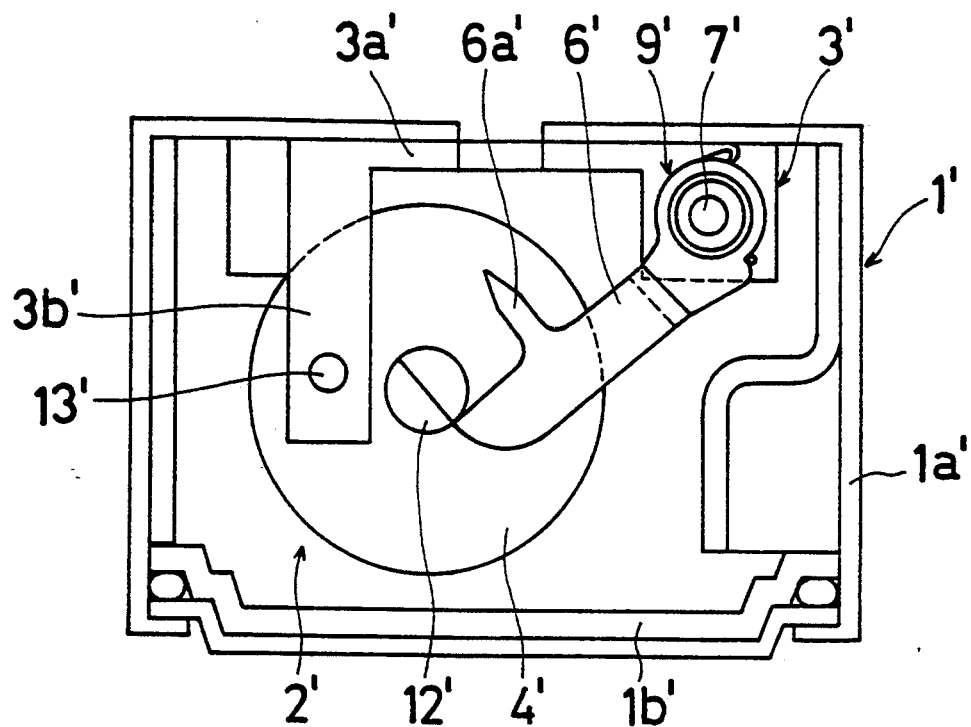
FIGS. 8 and 9 show sequential operations of a second embodiment of an impact sensing apparatus according to the present invention.

As shown in FIGS. 6 and 7, a weight 4' is pivoted at a position offset from the centroid thereof to a flange portion 3b' of a frame 3' so as to be rotatable about a pin 13'. The remaining portions of the second embodiment is similar to the structure of the first embodiment except that the former does not include the rack 11' and pinion gear 10'.

The foregoing structure of the second embodiment of the impact sensing apparatus according to the present invention is constructed or assembled by the following manner.

The weight 4' is pivoted to the flange portion 3b' of the frame 3. Then, the firing pin 6' is mounted on the pin 7' and is connected via the torsion spring 9' to the frame 3', and is also brought into engagement with the cam 12'. Thus, the weight 4' and the firing lever 6' are supported on the frame 3'. This means that these elements constitute a unitary assembly which is independent of the housing 1'. Thereafter, the frame 3' as the main portion or body of the foregoing unitary assembly is secured within the housing 1', which establishes the installation of the impact sensing mechanism 2' within the housing 1'. Thus, advantage similar to those of the first embodiment are obtained.

Figure 9:
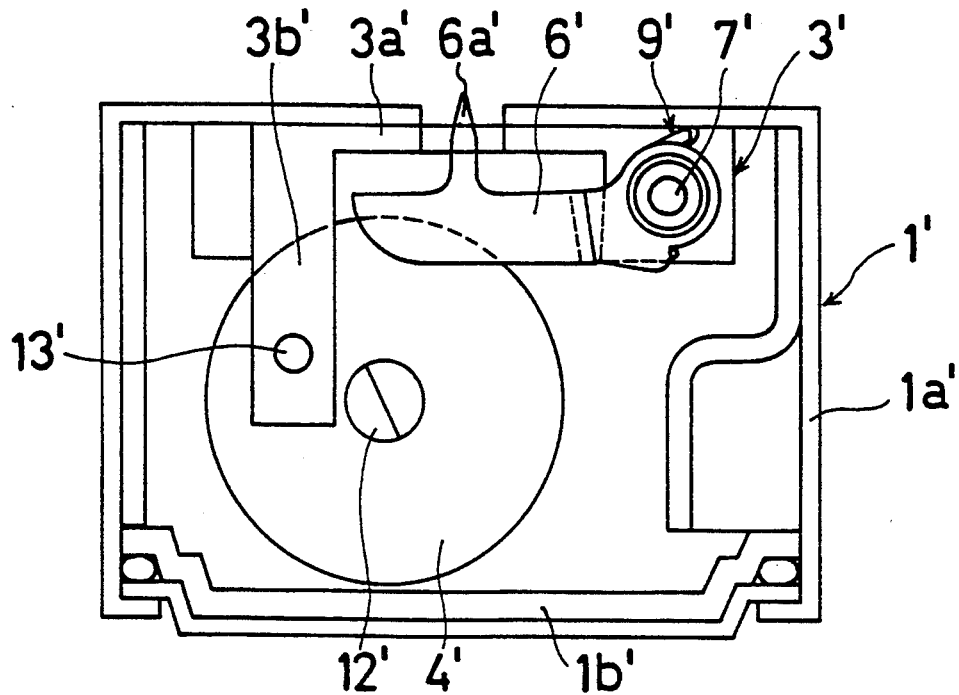

During operation of the second embodiment of the impact sensing apparatus according to the present invention, a shock or impact is applied to the housing 1' in the direction of "A" in FIG. 6 which shows the rest condition of the impact sensing apparatus. The weight 4' is brought into clockwise rotation against the biasing force of the torsion spring 9', thereby releasing the firing pin 6' from the cam 12'. Then, as shown in FIGS. 6' and 8, the firing lever 6 is rotated in the clockwise direction by the biasing force of the torsion spring 9', and the firing pin 6a' strikes the percussion cap after being projected outside the housing 1' through a hole 1d' (FIG. 9). In the second embodiment, the pinion gear 10' and rack 11' are not required to be prepared, thereby contributing to the simple structure of the apparatus.

The invention has thus been shown and described with reference to a specific embodiments, however, it should be noted that the invention is in no way limited to the details of the illustrated structures but changes and modifications may be made without departing from the scope of the appended claims.

What is claimed is:

1. An impact sensing apparatus comprising:
    a housing having an inner space and a wall for receiving an impact applied in a first direction; and
    a unitary assembly constructed independent of the housing and positioned within the housing for being secured to the housing, said unitary assembly including a frame having a first portion which extends along the wall of the housing and a second portion which extends transverse to the first portion, a weight pivotally mounted on the second portion of the frame to rotate about a pivot axis when an impact is applied to the housing, a cam provided on the weight, a firing lever pivotally mounted on the first portion of the frame for moving rotatably through an angle less than ninety degrees between one position in which a portion of the firing lever engages the cam and another position in which a portion of the firing lever extends outside the housing through the first portion of the frame in opposition to the first direction, and a spring urging the firing lever against the cam.

2. An impact sensing apparatus according to claim 1, wherein the pivot axis about which the weight rotates is stationary.

* * * * *